(12) United States Patent
Phillips et al.

(10) Patent No.: US 7,744,964 B2
(45) Date of Patent: Jun. 29, 2010

(54) VACUUM ROLL COATED SECURITY THIN FILM INTERFERENCE PRODUCTS WITH OVERT AND/OR COVERT PATTERNED LAYERS

(75) Inventors: Roger W. Phillips, Santa Rosa, CA (US); Keith Hollingsworth, Healdsburg, CA (US); Vladimir P. Raksha, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 23 days.

(21) Appl. No.: 11/765,904

(22) Filed: Jun. 20, 2007

(65) Prior Publication Data

US 2007/0273144 A1    Nov. 29, 2007

Related U.S. Application Data

(62) Division of application No. 10/891,335, filed on Jul. 14, 2004, now abandoned.

(60) Provisional application No. 60/487,527, filed on Jul. 14, 2003.

(51) Int. Cl.
    *H05H 1/00*    (2006.01)
(52) U.S. Cl. .............. 427/535; 427/209; 427/210; 427/211; 427/258; 427/259; 427/536; 427/537; 427/538; 428/209
(58) Field of Classification Search ............... None
    See application file for complete search history.

(56) References Cited

U.S. PATENT DOCUMENTS

| | | | |
|---|---|---|---|
| 4,022,928 A | 5/1977 | Piwcyzk | 430/296 |
| 4,511,616 A | 4/1985 | Pitts et al. | 428/203 |
| 4,652,015 A | 3/1987 | Crane | 283/91 |
| 4,705,356 A | 11/1987 | Berning et al. | 359/590 |
| 4,749,591 A | 6/1988 | Ronchi | 427/79 |
| 4,838,648 A | 6/1989 | Phillips et al. | 359/585 |
| 5,135,812 A | 8/1992 | Phillips et al. | 428/403 |
| 5,214,530 A | 5/1993 | Coombs et al. | 359/359 |
| 5,278,590 A | 1/1994 | Phillips et al. | 359/589 |
| 5,364,689 A | 11/1994 | Kashiwagi et al. | 428/195.1 |
| 6,105,589 A * | 8/2000 | Vane | 134/1.1 |
| 6,114,018 A | 9/2000 | Phillips et al. | 428/200 |

(Continued)

FOREIGN PATENT DOCUMENTS

EP    1258334    11/2002

(Continued)

OTHER PUBLICATIONS

"Proceedings of the Fourteenth International Conference on Vacuum Web Coating" Oct. 25-27, 2000 by Aerre Machine.

*Primary Examiner*—Michael Cleveland
*Assistant Examiner*—Joel G Horning
(74) *Attorney, Agent, or Firm*—Matthew A. Pequignot; Pequignot + Myers LLC

(57) ABSTRACT

A method for forming an optically variable device upon a substrate comprises the steps of: patterning a reflective layer on the substrate using an oil-ablation technique; removing oil residue from the first side of the substrate using a first glow discharge; and depositing thin-film layers so as to be supported by the substrate to form the optically variable device. Optionally, oil residue is removed from the second side of the substrate using a second glow discharge.

7 Claims, 12 Drawing Sheets

U.S. PATENT DOCUMENTS

| | | | |
|---|---|---|---|
| 6,157,489 A | 12/2000 | Bradley, Jr. et al. | 359/584 |
| 6,241,858 B1 | 6/2001 | Phillips et al. | 204/192.15 |
| 6,243,204 B1 | 6/2001 | Bradley, Jr. et al. | 359/585 |
| 6,474,695 B1 | 11/2002 | Schneider et al. | 283/72 |
| 6,569,529 B1 | 5/2003 | Phillips et al. | 428/403 |
| 6,574,087 B1 * | 6/2003 | Honda et al. | 361/303 |
| 6,576,523 B1 * | 6/2003 | Honda et al. | 438/381 |
| 6,686,027 B1 * | 2/2004 | Caporaletti et al. | 428/195.1 |
| 6,692,830 B2 | 2/2004 | Argoitia et al. | 428/403 |
| 6,699,313 B2 | 3/2004 | Coulter et al. | 106/31.6 |
| 6,706,412 B2 | 3/2004 | Yializis | 428/463 |
| 6,818,299 B2 | 11/2004 | Phillips et al. | 428/403 |
| 6,838,166 B2 | 1/2005 | Phillips et al. | 428/323 |
| 6,875,522 B2 | 4/2005 | Seto et al. | 428/611 |
| 7,054,042 B2 | 5/2006 | Holmes et al. | 359/2 |
| 2002/0160194 A1 | 10/2002 | Phillips et al. | 428/403 |

FOREIGN PATENT DOCUMENTS

| | | |
|---|---|---|
| EP | 1 353 197 | 10/2003 |
| EP | 1 741 757 | 1/2007 |
| GB | 2119312 | 11/1983 |
| GB | 2347646 | 9/2000 |
| WO | 8700208 | 1/1987 |
| WO | 02090002 | 11/2002 |
| WO | 02101147 | 12/2002 |
| WO | 02103624 | 12/2002 |
| WO | 03011980 | 2/2003 |
| WO | WO 2005/017048 | 12/2005 |

* cited by examiner

100 Euro text in patterned Aluminum —————— 235 micron

VACUUM ROLL COATED SECURITY THIN FILM INTERFERENCE PRODUCTS WITH OVERT AND/OR COVERT PATTERNED LAYERS

CROSS-REFERENCE TO RELATED APPLICATION

This is a divisional application of U.S. application Ser. No. 10/891,335, filed Jul. 14, 2004, by Phillips et al, entitled: "Vacuum Roll Coated Security Thin Film Interference Products With Overt And/Or Covert Patterned Layers," now abandoned which claims priority from U.S. provisional application No. 60/487,527, filed Jul. 14, 2003, by Phillips et al, entitled: "Imaged Optical Foils," the disclosures of which are incorporated herein.

BACKGROUND OF THE INVENTION

The use of security threads for protecting banknotes, credit cards and other valuable documents is well known. A security thread is a strip of material placed on the surface of a banknote document or sheet such as banknote; alternatively a security thread may be serpentined or woven into the banknote paper (a window type effect) to confer additional security (authenticity) to the bank note. Typical dimensions of a hot stamp thread are a width of 1-5 mm, a thickness of 3-4 µm; windowed polyester terephthalate (PET) based threads have a thickness of about 0.5 mil or 12.5 microns. By way of example, one of the earliest forms of security threads consisted of reflective foil transferred by hot stamping to the surface the banknote (GB 2119312 A). This reflective foil prevented reproduction of counterfeit banknotes by printing processes such as from printing presses, PC printers and copiers. Holograms (EP-A-0624688), holographic features along with thermo chromic features (GB 2347646), opaque coatings having characters and patterns readable by transmitted light in combination with luminescent substances (U.S. Pat. No. 6,474,695), repeating patterns of magnetic/magnetic indicia or metal dots (WO2103624), laser etching fine lines and text with a laser (German "Auslegeschrift" no. 22 05 428) and (WO02101147), printing micro-characters on a metalized transparent plastic with clear acid resistant inks followed by acid etching of the unprinted areas to produce shiny micro-characters on a transparent base (U.S. Pat. No. 4,652,015), bonded nucleic acid molecules so that complementary nucleic acid molecules can bind to the molecules already attached to the document (DE 10122836), and optically variable security elements using liquid crystal material (EP0435029) have all been used to make security threads. However, these aforementioned threads either take too much time to make and or have other associated problems; for example, it is found that laser etching takes too long to be cost effective, etching by use of chemicals requires multiple steps and is not considered to be environmentally-friendly; holograms can be readily copied, and in many instances the features of the threads are not readily seen by eye by the average person and machines are required to read them.

A method to pattern a single layer of metal or carbon in a vacuum chamber was advanced in U.S. Pat. No. 4,022,928 by Piwcyzk. Piwcyzk used various methods to apply a perfluoropolyether known as FOMBLIN™ or Krytox™ to a substrate requiring a pattern for a vacuum deposited layer. The perfluoropolyether inhibited the deposition of the depositing material to a web or plastic substrate. Application of this fluid was by spray or vacuum evaporation in combination with a selected removal process as with a laser or an electron beam. A printing method was also described. Printing techniques including relief printing such as letterpress or flexography, planographic printing such as offset lithography, and gravure, and screen-printing such as silkscreen process printing were disclosed.

Subsequently, Ronchi in U.S. Pat. No. 4,749,591 incorporated herein by reference, and in PCT application WO 8700208(A1)) advanced this printing process by applying the inhibiting oil, FOMBLIN, to a vacuum roll coater where patterning thin films on plastic substrates was desired.

Ronchi in U.S. Pat. No. 4,749,591 only discloses applying a single layer of metal, for example, aluminum as is shown in FIG. 1, deposited as a vacuum thin film layer. A demetallized aluminum layer in the case of a security thread embedded into a banknote can easily be forged by simply using a metallized polyester that is subsequently patterned by one of the above methods. In an attempt to copy a security thread having a single layer manufactured by Ronchi's technique, patterning by photolithography in combination with a caustic etchant, or by any of the aforementioned processes or even by using a silver pencil to simulate the security thread could be used. Security threads having multi-layer films where one of more of the layers are patterned has not previously been considered. A major impediment to providing several thin film layers, was residual oil remaining on the images and on non-patterned areas of the web. This residual oil was detrimental to further thin film coating since left over oil would cause "ghosting"; a process whereby the inhibiting oil is transferred to the back side of plastic film when roll coating, which in turn causes inhibiting oil to be transferred further down the web on the front side. Left over inhibiting oil also causes adhesion failures to subsequent thin film layers.

"Ghosting" and the ability to remove residual inhibiting oil is overcome by this invention. By way of this advance, for the first time, patterned multilayer optical stacks could be conveniently manufactured in a cost effective way on a security thread, by roll coating. In particular, a new optically variable security thread that had a high pattern resolution was made that contained readable text or graphic images where covert features such a magnetic signatures could also be incorporated.

It is an object of this invention, to provide a security thread having optically variable features such as an optically variable pattern that can be seen against a background that is distinguishable from the pattern, or from which the pattern stands out.

It is a further object of this invention, to provide a relatively simple, inexpensive method of manufacture of a multilayer patterned security thread for use within or upon a web or sheet, for example on currency, documents or packaging for providing authentication thereof.

SUMMARY OF THE INVENTION

In accordance with this invention there is provided, a security thread for embedding within or upon a sheet or document, comprising:

an elongate substrate having a first side and a second side;

an optically variable structure deposited on one of the first and second side of the elongate substrate, wherein the optically variable structure comprises a thin film interference structure which has the appearance of a plurality of separated interference filters arranged side-by-side and spaced from one another having visible color shifting properties in the form of a visible pattern of visually separated distinguishable indicia against one of a foreground and background of a different color.

This invention provides a security thread providing security to a sheet, document or packaging, wherein thread has a visibly optically variable structure thereon that is visible from at least one side of the sheet; although the optically variable structure may be a continuous plurality of layers forming a large Fabry-Perot cavity or interference filter, by providing a patterned layer in front of the Fabry-Perot cavity, the interference filter appears to be separate spaced filters. In another embodiment plural separated filters are provided which similarly appear as separated optically variable structures.

In accordance with this invention there is provided, a sheet having a security thread embedded therein or disposed thereon, the security thread comprising:

a substrate having a first side and a second side;

a plurality of separated n-layered Fabry-Perot cavities deposited upon the first side of the substrate, side-by-side, wherein the Fabry-Perot cavities are spaced from one another, wherein each n-layered Fabry-Perot cavity is a thin film interference filter having visible color shifting properties; said plurality of cavities being arranged along the substrate to form a visible pattern as a result of the color shifting properties.

In accordance with another aspect of this invention there is further provided, a security thread for imbedding within or disposing upon a sheet, wherein the security thread comprises a plastic web upon which is deposited layers of thin film color shifting coatings forming side-by-side, spaced apart interference filters, wherein the interference filters are seen as patterns against a background of a different color.

In accordance with one embodiment of this invention, a continuous Fabry Perot structure having plural layers defining one or more cavities can be applied to one side of a web or substrate. On a second side of the web, a pattern of aluminum or some other material visibly distinguishable from the Fabry Perot structure can be applied using an oil ablation process. Visually when one views the thread from the patterned aluminum side, the portions absent aluminum show as optical variable regions, and the portions with aluminum present show as contrasting aluminum regions. Hence in this embodiment, the continuous Fabry-Perot structure reveals to the viewer from the patterned side, plural side-by-side spaced FP cavities since the aluminum masks portions providing the pattern.

In accordance with yet another aspect of the invention there is provided a method for forming an optically variable device comprising the steps of:

patterning a reflective layer on a web substrate having a first side and a second side using an oil-ablation technique to form a patterned reflective layer;

removing oil residue from the first side of the web and depositing thin-film layers on the web substrate to form the optically variable device.

In accordance with another aspect of the invention there is further provided a method of patterning metal comprising the steps of:

applying a non-wetting oil to selected portions of a first surface of a web substrate to create an oil pattern;

depositing metal on the first surface of the web substrate wherein the non-wetting oil ablates depositing metal from the oil pattern; and removing oil residue using a first glow discharge applied to the first surface of the web and a second glow discharge applied to a second surface of the web.

In accordance with another aspect of the invention there is provided a machine-readable security device, comprising a web having disposed thereon, a patterned layer of magnetic material sandwiched between two metal layers.

In accordance with the invention a machine-readable security device is also provided wherein a security thread includes a magnetic material patterned thereon using an oil-ablation process.

The use of an oil ablation process is a preferred embodiment, allowing the coating and removal of a rolled on pattern within a coating chamber to yield a patterned web having a visible patterned interference structure. Notwithstanding, it is within the scope of this invention to use of other materials having similar properties to oil, wherein its removal is compatible with the coating of subsequent layers in situ. Alternatively, but less preferably, a water soluble polymer coating that can later be removed by washing is possible, however temporary coatings of this sort are not as useful as the application of oil, which can be removed within the deposition chamber.

This invention circumvents difficulties encountered in wet chemical etching methods for patterning by providing a novel security thread that is optically variable either in reflection or transmission with text or other patterns by using an all-dry process, in-line, in a vacuum roll coater. The human eye can readily see the optical performance of the thread as a color shift as the thread is tilted back and forth. Either the text or pattern is optically variable against a transparent or shiny reflective background, or alternatively the background is optically variable against the text or patterns that can be easily viewed in transmission. Furthermore, the thread and its pattern can be distinguished from the background of the sheet, which carries it. Alternatively, the thread can be viewed in reflection where the imagery appears to be colored or optically variable using foil or color shifting ink against a reflective background of aluminum or other colored metal such as copper, or an optically variable, or a non-optically variable thin film optical stack. Alternatively an embodiment of the invention provides the inverse or negative image of the above-mentioned structures. The optically variable optical stacks can take the form described in U.S. Pat. Nos. 4,705,356; 4,838,648; 5,135,812; 5,214,530; 5,278,590; 5,278,590; 6,157,489; 6,241,858; 6,243,204; 6,241,858; 6,569,529; and 6,699,313 to Phillips, an inventor of this invention. In addition, mica based interference pigments such as $TiO_2$ or $Fe_2O_3$ coated micas can be used as the color shifting pigments in the color shifting inks.

Various embodiments of this invention are described and shown in detailed description and accompanying figures. The thread can either be windowed into the banknote in much the same manner as that found in European patent application EP1258334 A3 in the names of Cunningham, and Brian or can be applied across the surface of the banknote.

Such threads as described in accordance with this invention cannot be accurately reproduced by way of being photocopied, photographed, or printed since these technologies do not possess optically variable effects. Furthermore, in the case of optically variable foil, the optics of copiers prevents even the face color at normal incidence from being imaged; since just a black image results as the reflective surface of the optically variable thread causes the light to miss the entrance optics of the copier. In addition, the intricate design of the text, having a resolution down to 60 microns, would prevent any counterfeiter from using scissors to simulate this security device.

BRIEF DESCRIPTION OF THE DRAWINGS

Exemplary embodiments of the invention will now be described in conjunction with the drawings in which.

DETAILED DESCRIPTION

Figure 1:
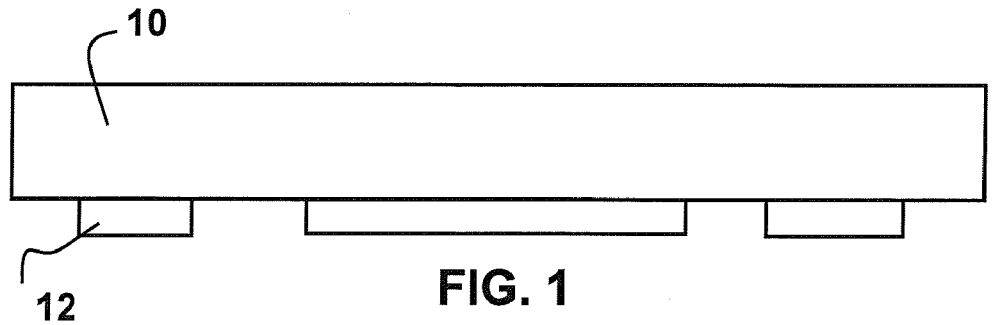
FIG. 1 is a diagram illustrating a prior art device wherein a layer of patterned aluminum on a PET substrate or web.
Figure 2:
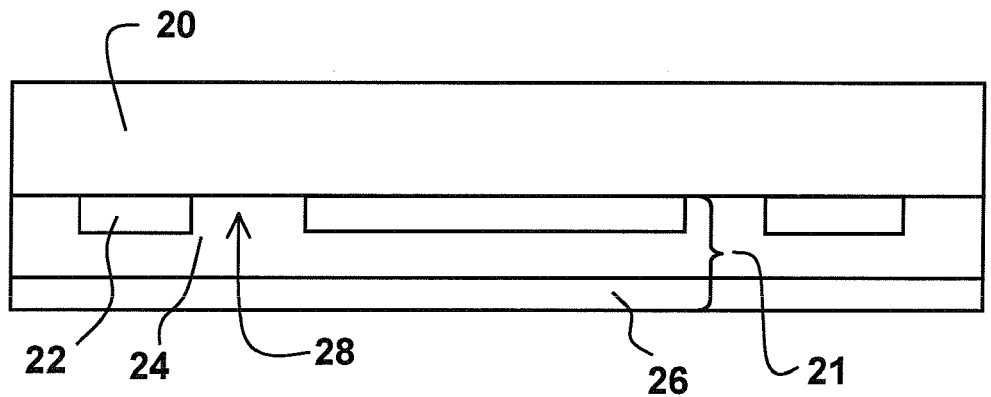
FIG. 2 is a cross sectional view showing an embodiment of the invention wherein interference structures are shown created by layer of patterned aluminum on a PET web covered with a spacer layer of MgF2 capped by a Cr layer, the three layers forming a plurality of optical interference structures, side-by-side having windows, therebetween.

Referring now to FIG. 2 a layer of patterned aluminum 22 on a PET web 20 is shown. This embodiment is not limited to the use of aluminum as a reflector material and other reflecting materials, for example another reflecting metal could be used instead of aluminum. The PET web forms the base of the security thread upon which the layers shown are deposited; however other materials, such as other plastics could be used in place of PET. The aluminum patterned layer 22 is covered by a spacer layer 24 of MgF2 deposited over the patterned aluminum and web which forms windows 28 in regions over the web absent the deposited aluminum; a layer of absorber material 26, such as a thin layer of chromium, is deposited over the spacer layer 24. An optical interference structure is formed from the reflector/dielectric spacer/absorber (R/D/Ab) stack over the remaining portions of the patterned metal, but not over the portions of the web where the Al has been removed; these portions were Al has been removed are referred to as window portions. The optical interference structure(s) 21 can be color filters that gives the patterned metal a particular appearance, or one that gives the patterned metal a color-shifting, "optically variable" appearance. The aluminum is patterned by printing an image or pattern onto the plastic web 20 using the "inhibiting oil" and then depositing a thin film of aluminum. Although the exact mechanism by which the oil prevents the sticking of the vacuum deposit to the substrate may not be entirely understood, the process nevertheless works. Various theories have been proposed to explain this phenomenon. One theory invokes the idea that the heat of condensation of the depositing material turns the oil into a gas and in effect ablates the metal away. Another explanation is that the oil simply prevents nucleation of the depositing material and hence the arriving material is scattered away.

In the embodiment shown in FIG. 2 the Al—MgF$_2$—Cr stacks each form a Fabry-Perot ("F-P") absorber-spacer-reflector-type optically variable device ("OVD"), which are not formed over the window portions of the web because there is an absence of a Fabry-Perot structure in these areas. The plastic web can be clear, tinted, translucent, or opaque, and the materials chosen for the patterned metal layer and overlying thin films are merely exemplary. After coating the thin-film layers, a protective layer is optionally applied, such as a thin layer of lacquer, not shown, or a thin (e.g. 0.5 mil) plastic film that is adhered to the OVD using laminating adhesives.

Figure 3A:
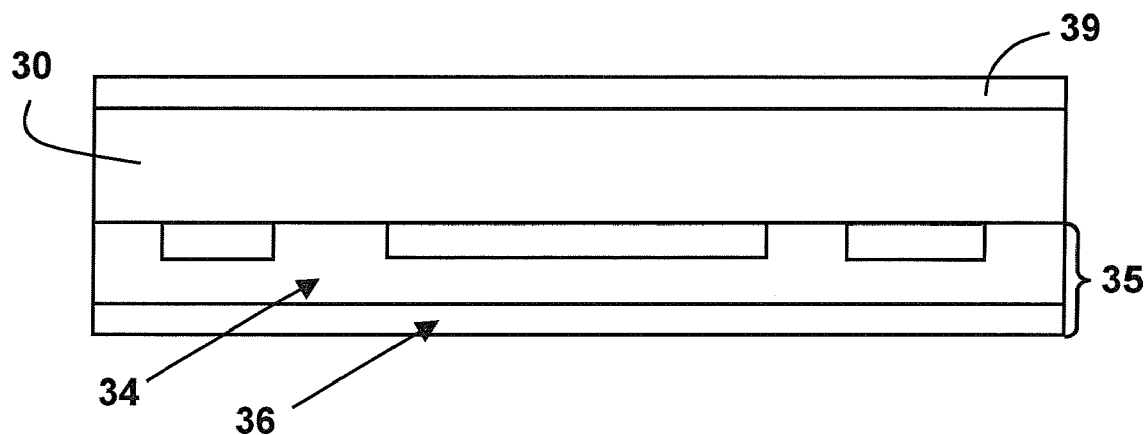
FIG. 3a is a cross sectional view of a layered structure with patterned aluminum on one side of a PET web, an optically variable foil coating on the same side of the PET web, and a different optical coating on the other side of the PET web.

FIG. 3a shows a layer structure, similar to that of FIG. 2 on a front side of a web 30. Patterned aluminum is deposited after using a roll-coater with inhibiting oil to apply a pattern of oil to prevent permanent deposition onto predetermined regions of the web 30 on a "front" side of a PET web. Layers 34 and 36 of MgF$_2$ and Cr are deposited over the front side to form optical interference structures over the Al; the Al serves as a reflector in the Fabry-Perot structure(s). Another optical structure 39, such as a reflective layer, an optically variable (OV) layer, a magnetic layer, either continuous or patterned, either sandwiched between layers of aluminum or as a single layer or fluorescent layer is formed on the "back" side of the web. In this embodiment, a protective layer is optionally applied to both surfaces of the OVD. The optical structure may be opaque or semi-transmissive.

In accordance with this invention, in the embodiment where a magnetic layer is sandwiched in between the reflective layer, as is described in United States Patent application No. 2002/0160194A1 and WO 02090002(A2), in the name of the same inventor, a cover signature is present. A number in digital code or as in a bar code may be present, that is unseen by the naked eye, and may be fore validating the serial number on the bill or the denomination for example, $50.00.

In this embodiment, where a magnetic bar code is hidden within the device, it exhibits the same reflective properties as aluminum but has a magnetic signature that can be read with appropriate magnetic detectors. The magnetic detection may be just the presence of a magnetic material as in a magnetic image such as a hidden bar code or a hidden logo, or may be a signal of digital or analog recorded information.

In accordance with this invention, the thickness of the magnetic layer is preferably between 0.1 and 1.0 microns in thickness. In the prior art, it is known to use a thick layer for example having a thickness of 12 to 13 microns. Notwithstanding, this invention can provide a very thin layer that is detectable by providing a continuous layer of magnetic metal or metal that is detectable by magnets. Thinner layers are advantageous for use with security threads to be imbedded in or on currency so that a large stack of bills do not pile up at an angle when stacked. Furthermore, providing thinner layers ensures that that overall thickness of the thread remains relatively thin, which is desired. Hence, the thickness of the magnetic layer should be less than 5 microns and preferably less.

Figure 4:
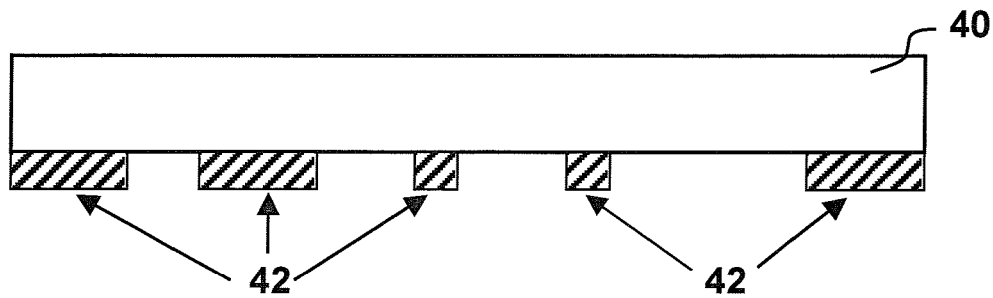
FIG. 4 is a diagram of an embodiment illustrating a patterned magnetic layer on a PET web.
Figure 5:
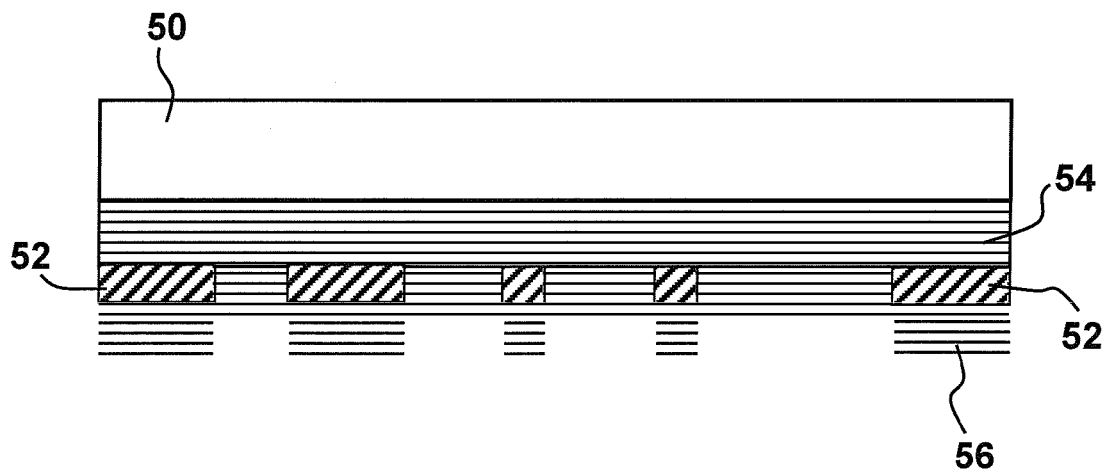
FIG. 5 shows an embodiment of the invention wherein a patterned magnetic layer is sandwiched between two layers of aluminum on a PET web.

In the simplest case, as shown in FIG. 4 a single layer 42 of magnetic material may be deposited onto the plastic web 40, patterned by the oil imaging method, and then formed into a security thread, label or hot stamp image. In more complicated structures, the patterned magnetic layer 52 supported by a substrate 50 is sandwiched between two layers of aluminum 54 and 56 as is shown in FIG. 5 or is sandwiched between two layers of aluminum in a Fabry-Perot optical stack shown in detail in FIG. 6 wherein a substrate 60 has deposited thereon a patterned aluminum layer 62; upon the layer 62 is a Cr layer 63 a dielectric layer 64, and a magnetic layer 66 between two Al layers 65 and 67 upon the dielectric layer 64. In the instance where only one side of a security thread is visible, the magnetic layer 66 can be covered by a single layer of aluminum 67 and need not be sandwiched between two such layers.

Referring now to FIG. 5, a cross-sectional view is shown wherein a plastic substrate 50 has deposited thereon a non-magnetic layer 54 of aluminum. Of course other non-magnetic materials could be used. A pattern of inhibiting oil is then applied to create a predetermined bar-code pattern of oil dependent upon the design upon the rollers that pick up the oil and coat the plastic web 50. The magnetic layer 52 is subsequently deposited and magnetic material only remains where no oil has been applied during the vacuum coating and cleaning process. A final layer of non-magnetic material 56 effectively sandwiches the magnetic layer 52 between the two non-magnetic layers.

In an alternative embodiment now shown, one could use an additional layer over a patterned layer to serve as a leveling layer. This could be done by evaporating an organic smoothing layer in vacuum and curing by cross linking as taught by Yializis in U.S. Pat. No. 6,706,412. In the embodiment described in accordance with this invention, the depth of the vacuum deposition layer is considerably thinner than the thickness of the oil pattern; hence in relation to the oil thickness of about 10,000 Angstroms the small bumps of 1000 Angstroms or less for the vacuum deposited layer would be negligible. Patterning for multilayers could take place on unpatterned regions or even on previously patterned regions.

Figure 6:
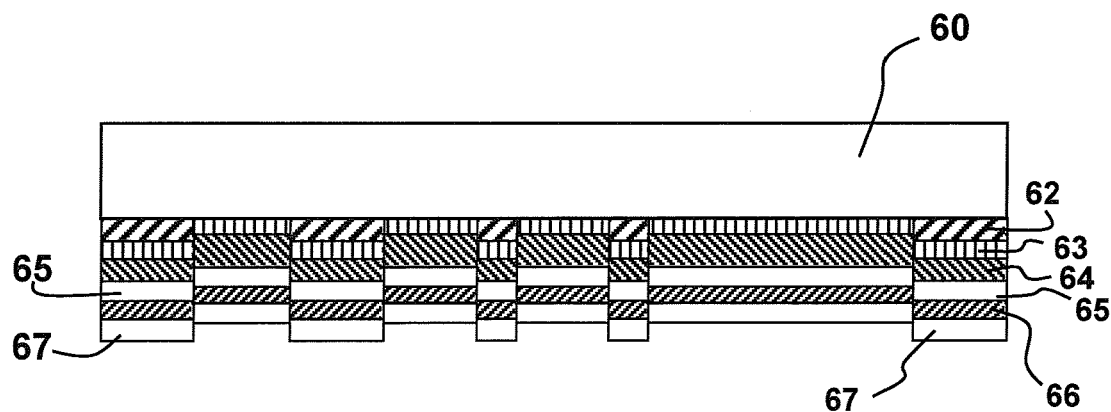
FIG. 6 shows an embodiment with a patterned aluminum layer on one side of a PET web and an optically variable foil with a hidden magnetic layer on the same side of the PET web.

FIG. 6 is a more complex structure than that of FIG. 5, however the method of manufacture is essentially the same, patterning and depositing subsequent layers.

In yet another embodiment of the invention the combination of patterned thin film with color shifting ink including but not limited to inks containing pearlescent type pigments based on coated mica, SecureShift® colors (registered to Flex Products), optically variable ink (OVI®, registered to SICPA), inks based on diffractive based pigments or liquid crystal color shifting inks can be present. The pigment may be formed of flat thin film optical structures or may be formed of diffractive flakes as described in U.S. Pat. No. 6,692,830 and PCT patent application WO 03011980A1.

Figure 7:
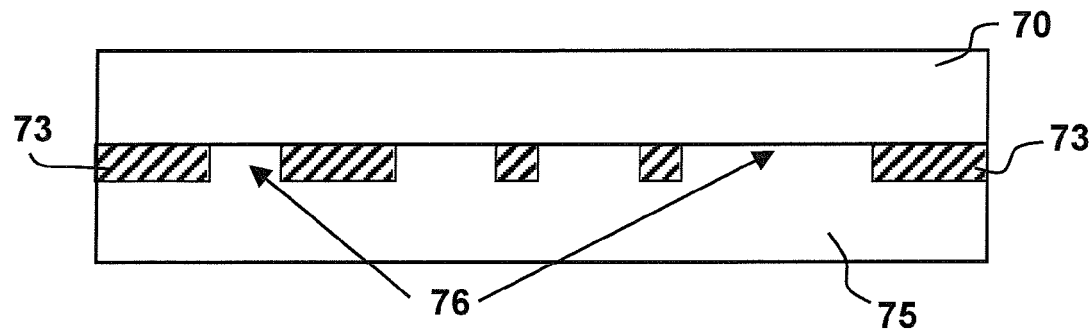
FIG. 7 is an illustration showing a patterned aluminum layer deposited on a plastic substrate over-coated with color shifting ink on one side of a PET web.
Figure 8:
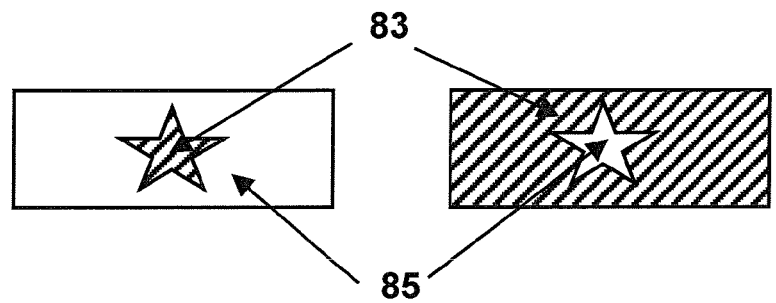
FIG. 8 shows the effect of positive and negative patterned aluminum layer over-coated with color shifting ink layer on one side of a PET web.

Referring now to FIGS. 7 and 8 an embodiment of the invention is shown that utilizes color-shifting ink. In this instance, the color shifting ink 75 is visible through the holes or windows 76 in the patterned thin film 73. In the simplest case, a patterned aluminum 73 is formed on a plastic film 70 such as polyester terephthalate (PET) and the color shifting ink 75 is coated over the patterned aluminum so that from the opposite side, one sees a color shift with viewing angle through the text or graphic images or appears as background around reflective text or graphics.

In FIG. 8 is an illustration showing that the background can be non-color shifting and foreground color shifting or vice versa.

Figure 9:
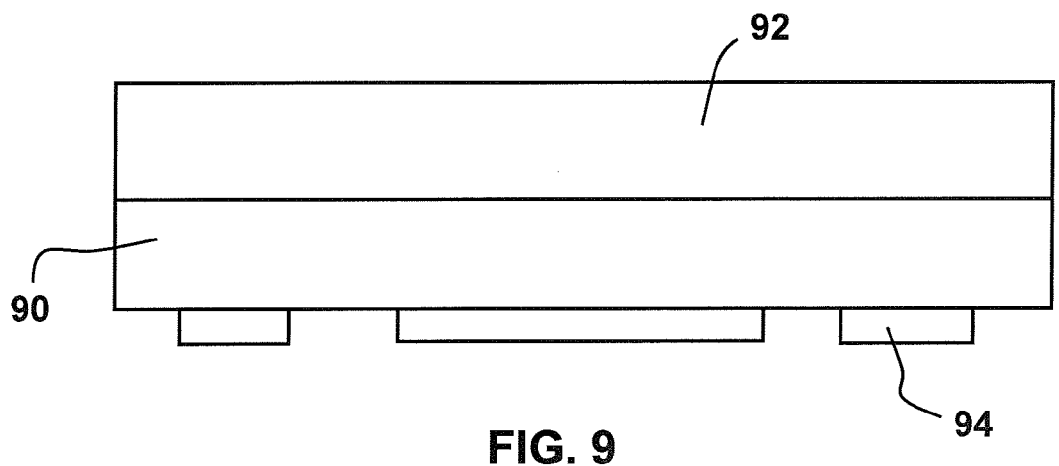
FIG. 9 is a diagram of an embodiment of the invention wherein a patterned aluminum layer is deposited on one side of a PET web and a color shifting ink layer is coated on the opposite side of the PET web.
Figure 10:
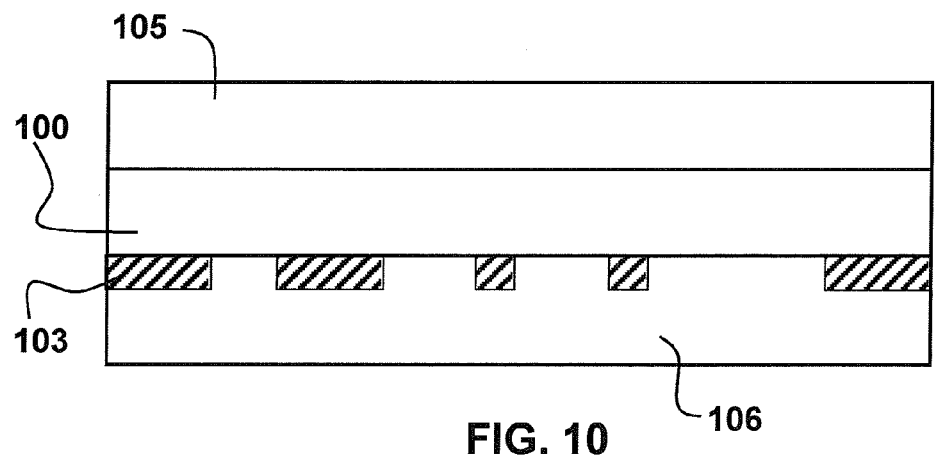
FIG. 10 is a cross sectional view illustrating a patterned aluminum layer deposited on one side of a PET web over-coated with a protective layer of abrasion resistant lacquer and a color shifting ink on the opposite side of the PET.

Alternatively the color shifting ink is coated onto the surface opposite the patterned aluminum so that one views the security device from the patterned aluminum side. In this instance, the color shifting ink shows through the openings of the patterned aluminum. As in embodiments described heretofore, the patterned aluminum can have an additional protective layer placed upon it, such as a scratch resistant lacquer or is laminated to a thin PET sheet typically having a thickness of 0.5 mil or less. FIGS. 9 and 10 exemplify these structures.

In FIG. 9 a plastic web 90 has on an upper side thereof an optically variable structure 92, for example in the form of optically variable ink, color shifting ink, optically variable pigment or a thin film Fabry-Perot cavity structure. On a lower side of the web, a patterned layer of aluminum 94 is shown. In FIG. 10 a color shifting ink layer 105 is disposed upon a plastic substrate 100 and a patterned layer of aluminum 103 is deposited on the lower side of the substrate 100 having a protective lacquer coating 106 over it.

In one embodiment, the reflective layer is a layer of opaque aluminum, so that the window portions of the patterned layer appear reflective. The backside reflector does not typically form an OV structure with the front side MgF2—Cr layers because the intervening PET web is relatively thick for use as a spacer in a Fabry-Perot structure in the visible range of light. The window portions appear mirrored, while the front-side F-P structures provide an OVD as is shown in FIG. 3*a*.

Figure 11:
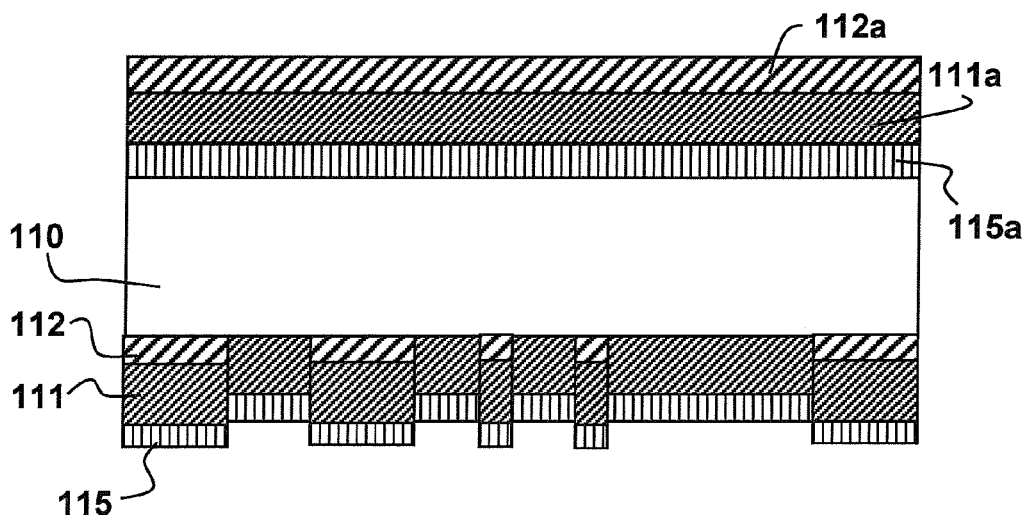
FIG. 11 shows a patterned aluminum layer over-coated with a Fabry-Perot design on one side of a PET web and coated with a second different Fabry-Perot design on the second side of the PET.

Alternatively, the optical structure on the backside of the web is an optical interference structure, such as a thin-film absorber layer on the PET web, a spacer layer over the absorber layer, and a reflective layer over the absorber layer, thus creating a second F-P structure in addition to the F-P structures on the frontside of the web as is shown in FIG. 11. A reflective backside layer 112a is particularly desirable for security threads with OVDs because the mirror-like background provides a good visual reference to the color change of the frontside OVD. This reflective backside layer also serves as a layer in the optically variable structure defined by the two adjacent layers; a Cr layer 115a, a dielectric layer 111a. FIG. 11 also shows a plastic substrate 110 having a patterned aluminum layer 112, followed by a dielectric layer 111 having a layer of Cr 115 over top.

Alternatively, a layer of color shifting ink may be applied to the backside of the web. The application of color shifting ink to the backside of the web enables an optically variable (OV) effect when the structure is viewed from either side. When viewed from the backside, the OV effect of the color shifting ink is observed. When viewed from the front side, the OV effect of the color-shifting structures formed with the patterned Al layer is observed, in addition to the OV effect of the color shifting ink.

Figure 12:
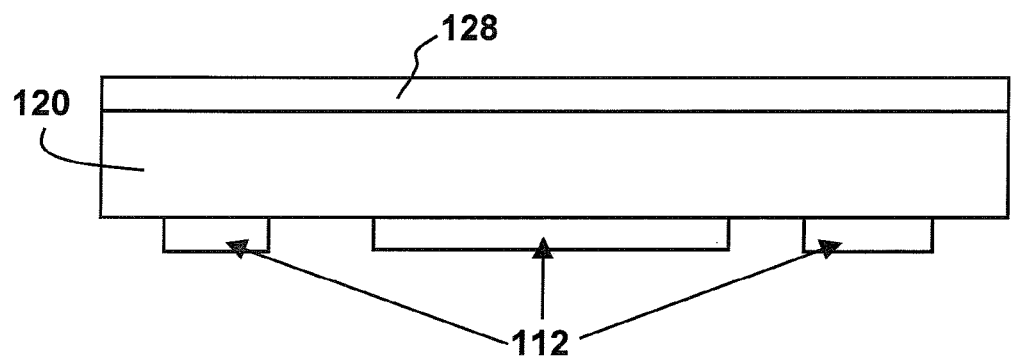
FIG. 12 is a cross sectional view of a patterned aluminum layer on one side of the PET web and a continuous optical structure on the second side of the PET.

Turning now to FIG. 12, a PET web 120 is shown with patterned aluminum 112 on the front side and an optical structure on the backside. In one embodiment the optical structure is an organic layer 128 containing Anti-Stokes material in the form of powder. The Anti-Stokes layer fluoresces at a shorter wavelength when illuminated at a longer wavelength. Many suitable materials exist, and are typically applied to the backside of web as very fine particles in a carrier. Powdered Anti-Stokes material is available from STAR DUST TECHNOLOGIES. The particles are generally light-colored, such as a cream or a light tan color, and fluoresce in a color, such as blue, green, yellow, or orange when irradiated with near IR light, which is outside the visible range. Thus, when the window portions are irradiated with the near IR light, the window portions fluoresce in a visible color. This can be used as a covert security feature because the Anti-Stokes coating is not easily seen by casual observation.

Figure 13:
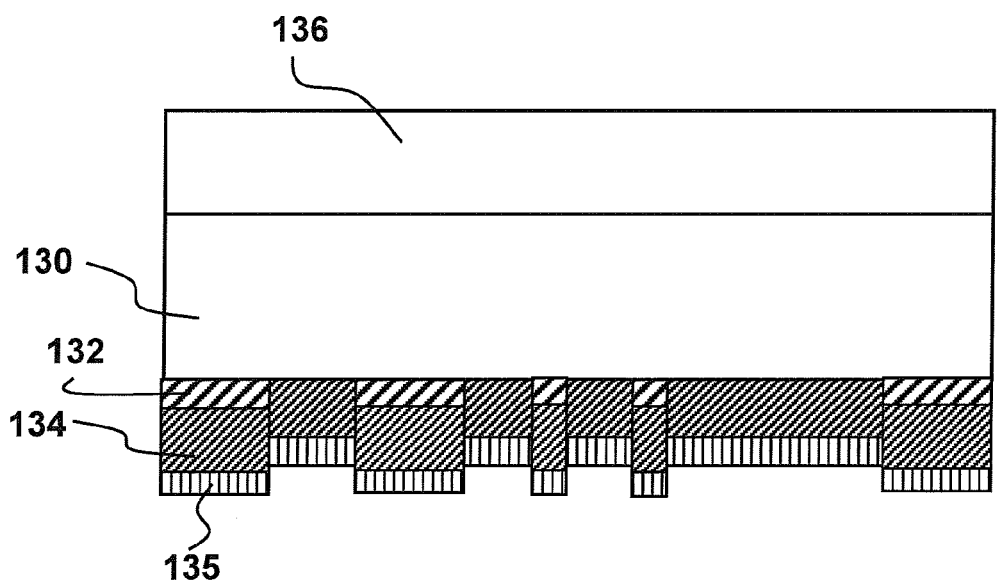
FIG. 13 shows a patterned colored shifting foil and one side of the PET and a printed layer of ink (black or complimentary color to the color shifting foil) on the second side of the PET.

Alternatively, shown in FIG. 13, a patterned optically variable foil comprising a patterned layer of aluminum 132, a dielectric layer 131, and a Cr layer 135 may be formed on one side of the PET and a printed layer of regular ink 136 is printed on the second side of the PET substrate 130. The printed ink 136 is either black in color or is a complimentary color to the normal (90 degree) color of the color shifting foil. In this case, the black or complimentary color shows through the windows of the patterned OVD or in the reversed image, the black or complimentary color layer acts as a background for the color shifting patterned text. For instance, a green to blue color shifting foil would have a magenta printed ink on the second side of the PET; for example, green and magenta are complimentary colors. In both instances, the contrast between the printed ink layer and the color shifting foil allows easy viewing in reflected light. A matching color could also be printed so that the reflected colors of the text only show up at other angles than the one at normal.

Figure 3B:
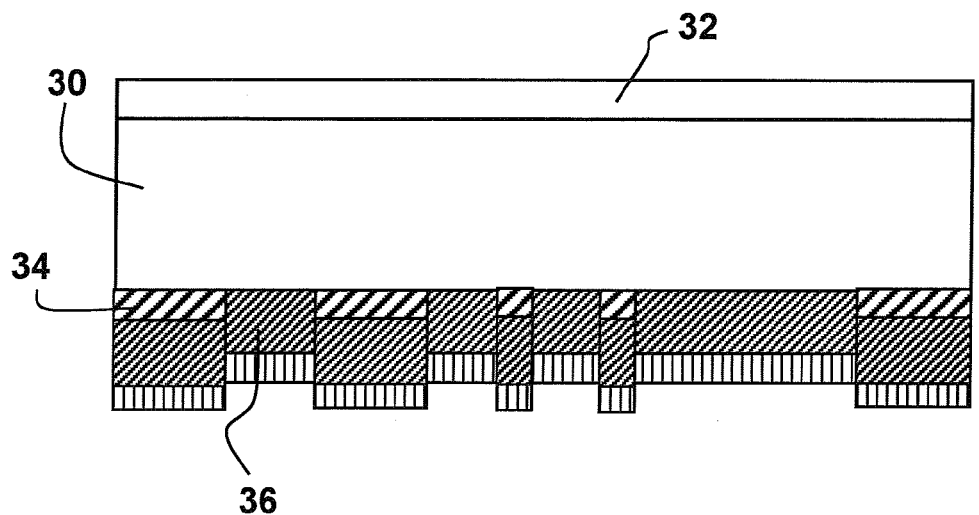
FIG. 3b is a cross sectional view similar to that of FIG. 3a, with the addition of an embossing of the plastic layer.

In an embodiment shown in FIG. 3b, the plastic web a plastic film 30 has an embossed surface coated with an aluminum layer 32 on the side opposite the patterned coating 34 so that the holographic imagery or diffractive imagery shows through the holes 36.

Figure 14:
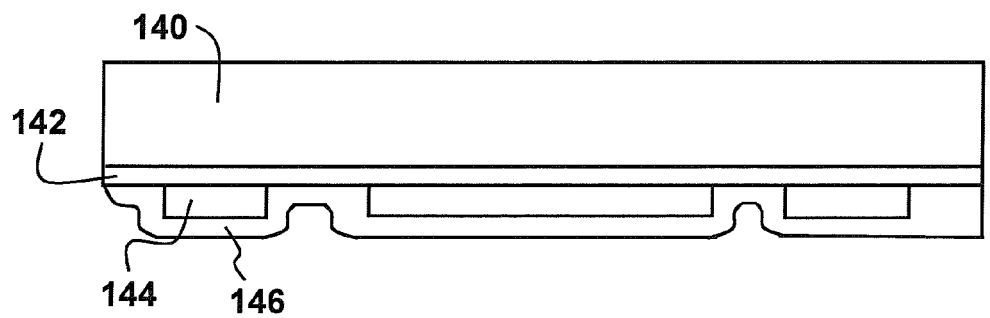
FIG. 14 is a cross sectional view showing a Fabry-Perot design on a PET web where the dielectric spacer layer is patterned.

FIG. 14 shows an OVD (optically variable device) formed on a web 140 wherein a reflective layer 142, such as an Al layer is deposited, and an overlying spacer layer, such as an MgF2 layer 144, is patterned, with the oil-"inhibiting" technique. An absorber layer 146, such as a thin layer of Cr, is deposited over the underlying layers to form OVDs where the reflective, spacer, and absorber layers form an F-P structure. As with the OVD shown in FIG. 3a wherein the optical structure on the backside is a reflective layer, the embodiment shown in FIG. 14 may have highly reflective regions proximate to the OVD structures that provide visual references when observing the OVD. In another embodiment, more dielectric layer material can be deposited onto the patterned dielectric so that a color-shifting pattern is formed on top of a different color-shifting pattern, once the final absorber layer has been deposited.

Figure 15:
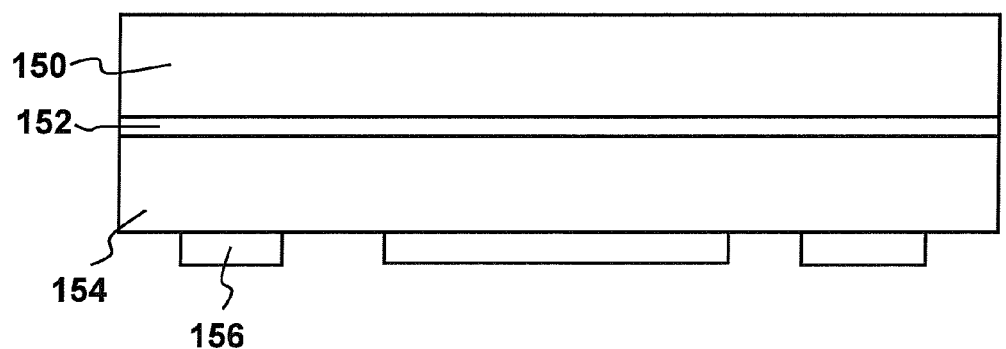
FIG. 15 is a cross sectional view showing a Fabry-Perot design on a PET web where the absorber layer is patterned.

FIG. 15 shows an OVD formed on a web 150 with reflective and spacer layers 152 and 154 respectively formed on the web and an overlying patterned absorber layer 156. The absorber layer is patterned using the oil-ablation techniques. An OVD is formed where the absorber material remains.

Figure 16:
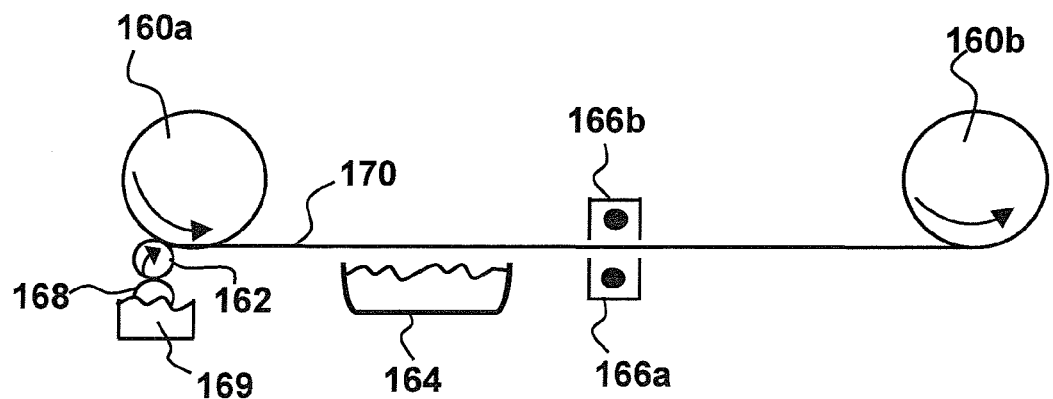
FIG. 16 is a diagram, which illustrates a simplified coater according to an embodiment of the invention.

FIG. 16 shows a simplified coating machine according to an embodiment of the invention. The coater includes an unwind roller 160a, a wind roller 160b, a printing head 162, an evaporation boat 164 and glow discharge elements 166a and 166b. In operation, the printing head 162 receives the "inhibiting oil" oil from the pick-up roller 168 and applies the oil to a PET web 170.

The oil has the property that it does not readily evaporate in the vacuum of the roll coater, but readily evaporates when subjected to the heat of condensation of the evaporating material. In addition, the oil has the property that is does not spread on the surface of the plastic web i.e. there is little, if any, dot gain.

The oil must stick to the substrate but not spread beyond the image area that is printed. Ideally, it should have an interaction with the plastic web but not spread. If it spreads beyond the image of the imprinting cylinder, the image will not be faithfully reproduced. If the graphic images are in pixel form, it is important that pixels are distinguishable from one another and do not have edges or portions that run into each other. Such an unwanted increase in pixel size is known as dot gain. For very thin layers of oil it likely does not make any difference whether it is wetting oil or non-wetting oil. However, it is preferable that oil not bead up. If the oil was thick and non-wetting, it would simply bead up and run off of the web and not maintain the printed image. The spreading of one material on another is determined by the respective surface energies, γA, γB and γAB, where γA is the surface tension (ie. surface energy) of the plastic web, γB is the surface tension of the oil and γAB is the interfacial surface tension. Spreading is determined by the equation $S_{L/S}=\gamma A-\gamma B-\gamma AB$, where $S_{L/S}$ is the spreading coefficient. If $S_{L/S}$ is positive, spreading will occur. In other words, γA is larger than the sum of γB and γAB which means (γB plus γAB) has a lower surface energy than γA. Thus, to minimize energy, spreading will occur. Therefore, $S_{L/S}$ should be negative so that spreading of the oil on the plastic substrate does not occur. As mentioned above, spreading would be detrimental since the dot gain would reduce the resolution from the original print image on the patterned imaging roller. The oil also has a low vapor pressure so that it does not evaporate after printing the image onto the web. FOMBLIN or Krytox oils meet the spreading criteria; however, other low vapor pressure oils may be used depending on the substrate being used.

In operation, the web is advanced to the evaporation boat, which deposits Al or other material on the surface of the web. Process conditions are controlled so that the heat of condensation of the Al vaporizes the oil where it underlies the Al, removing the Al from the regions that previously had oil. An alternate explanation is that the oil prevents nucleation of the depositing aluminum, i.e. the aluminum does not stick and re-evaporates into the chamber. However, even though the process occurs under vacuum, it was discovered that either products of oil breakdown and/or residual oil (generally "oil residue") may be present on some portions of the web, including the backside of the web after vacuum deposition. Such residue can degrade the optical performance of OVDs subsequently formed on the web and prevents acceptable adhesion of subsequent then film layers. It is very difficult to even detect the presence of such residue, absent forming an OVD and evaluating its optical performance. Ghosting, smearing, and other undesirable effects were observed when thin-film OVD structures were deposited on webs with patterned Al without some cleaning of this residual oil. The Al was deposited and patterned in one vacuum coater, and the OVDs were deposited in another vacuum coater. It was found that oil residue removal can be performed in the Al coater after patterning, in the OVD coater before deposition, or that a single vacuum roll coater can be used to deposit and pattern the Al and to deposit the OVD layers, with an intervening cleaning.

A glow discharge cleaning technique was used to successfully remove oil residue. Several types of glow discharge cleaning techniques were evaluated, as well as other cleaning techniques. A glow discharge cleaning technique using argon gas was tried, but did not adequately clean the residue of the oil used in the patterning process. IR heaters were used before coating, but oil transfer still occurred, presumably because oil transfer between layers of the web occurred. For example, oil residue on the frontside of the web will be transferred to the backside of the web on the wind roll. In an in-line process that coats the OVD before layers of the web are wound together, frontside cleaning of residue may be sufficient. However, with the oil used in this example, it is believed that some amount of cross-contamination occurred during the patterning process, and cleaning both the frontside and the backside was performed, as shown in FIG. 17.

Many additional features of the coater are omitted, such as tensioning rollers and chamber dividers. Similarly, the web may be held against a drum during the Al deposition/patterning.

Figure 17:
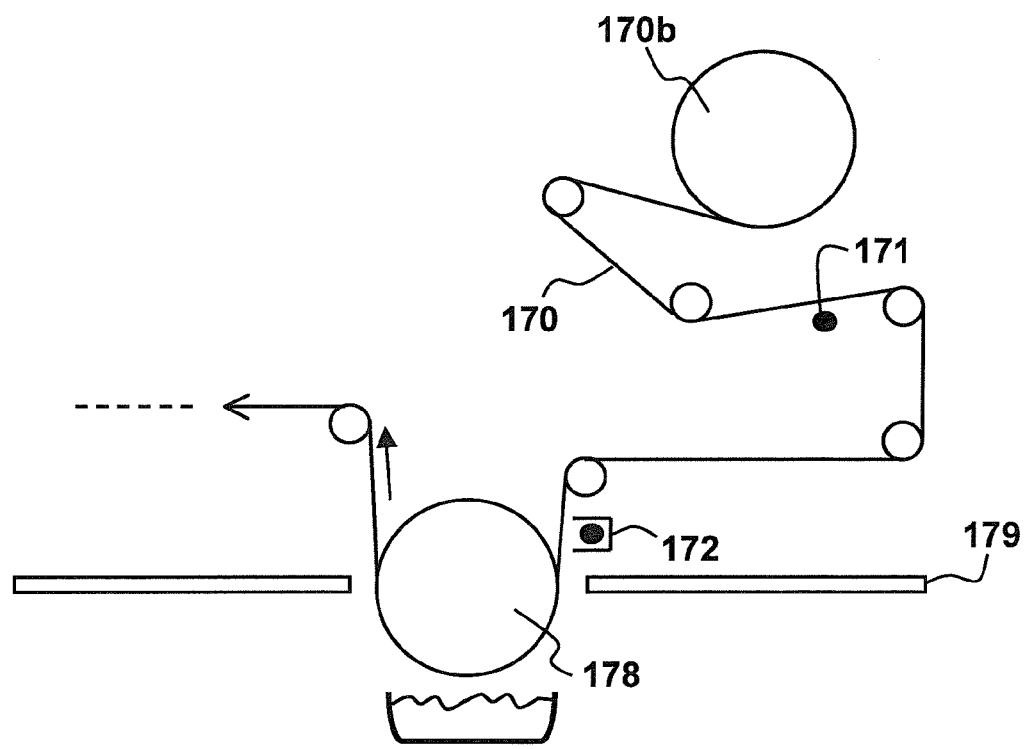
FIG. 17 is a diagram which illustrates a cleaning arrangement within the coating chamber to remove residual "inhibiting oil".

FIG. 17 shows a simplified depositing apparatus for cleaning a patterned web. The patterned web 170 comes off the unwind roller 170b and along a series of tension rollers. The backside of the web is cleaned at a first station with a first glow bar 171, shown as being unshrouded. The frontside of the web is cleaned at a second station 172 further along the web with a glowbar that is shrouded. The shroud is optionally omitted if the glow discharge does not affect other system components. Similarly, cleaning the backside of the web might not be necessary in all embodiments. Oxygen was provided to the glowbar shroud, but could be provided at other locations of the chamber. The oxygen provided at the shroud diffused to the region of the first glowbar to create the cleaning discharge. A chamber divider 179 keeps material from the OV source(s) from depositing on the tension rollers and other system components. The web is tensioned against a coating drum 178 during deposition of the OV layers. A glow discharge using $O_2$ as the precursor was found to work well to clean the web of oil residue. Other precursors may be preferred for other oils or liquids, or even for this type of oil residue. In a particular embodiment, a web of PET about 8.5 inches wide was transported through a glow discharge cleaning stage at a speed of 0.5 meters/second. The total current to the backside glowbar and the frontside glowbar was 100 mA and the glowbars were operated at 2,200 Volts. Pure $O_2$ was provided to the shroud of the frontside glowbar to create a chamber pressure of $5 \times 10^{-3}$ Torr to remove the residual oil from both sides of the patterned web. An OVD that was formed on the patterned web after cleaning in this fashion showed good optical characteristics, suitable for use in commercial applications.

FURTHER DESCRIPTION OF EMBODIMENTS OF THE INVENTION

The invention is generally directed toward methods and apparatus for manufacturing imaged foils, as well as security articles including optically variable foils and security labels. In a particular embodiment, an optically variable foil is produced using an all vacuum in-line process.

Figure 18:
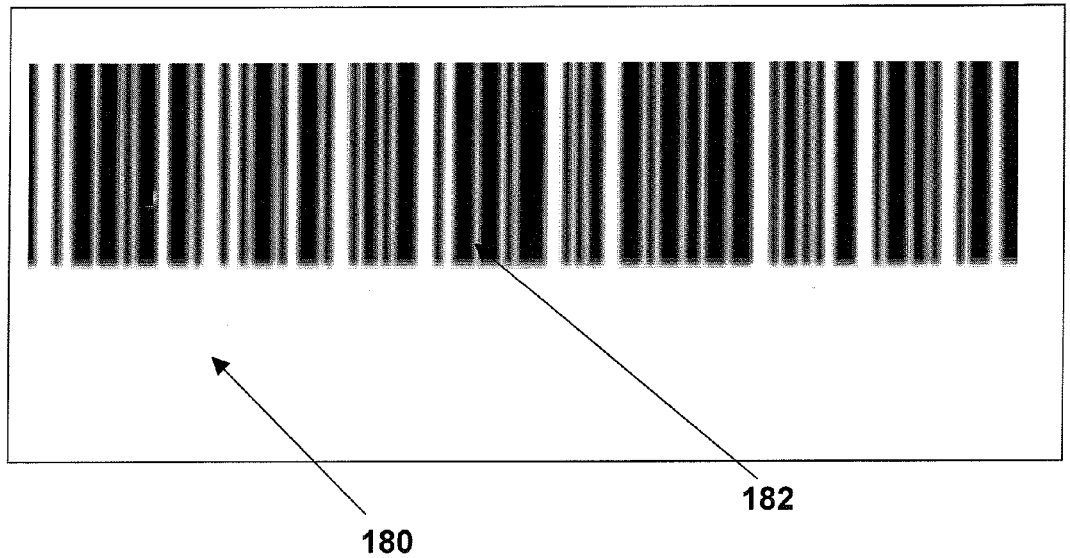
FIG. 18 is a view of a one dimensional magnetic bar code pattern hidden within the aluminum layers, wherein the Al layers are conveniently shown in this figure to be transparent so that the bar code can be seen.
Figure 19:
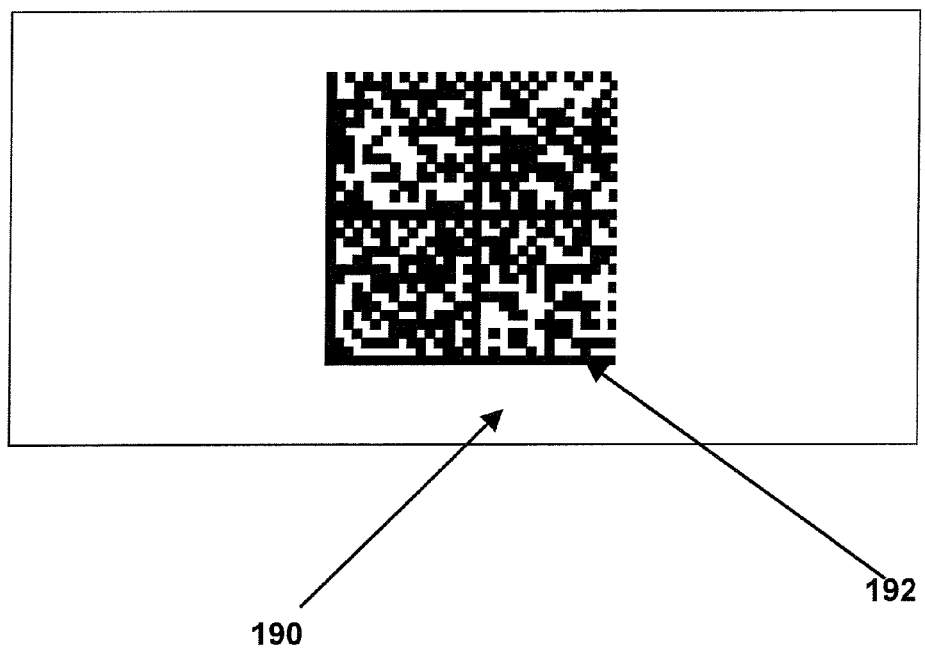
FIG. 19 shows a two-dimensional magnetic bar code pattern hidden within the aluminum layers.

A substrate consisting of 0.25 to 5 mil PET, preferably 0.5-1.0 mil (1 mil=25.4 microns) is first patterned on the web, width 2"-60" or more, with a positive or negative image with perfluorinated polyether as described in US publication "Proceedings of the Fourteenth International Conference on Vacuum Web Coating, Oct. 25-27, 2000 by Aerre Machine. A printing station similar to that described in U.S. Pat. No. 4,749,591 was used and is incorporated herein as a reference. However, the printing method is not necessarily limited to that described in U.S. Pat. No. 4,749,591. For example, other printing techniques may be used include ink-jet printing, flexographic printing, gravure printing or lithographic printing, or even dot matrix printing. In the case of ink-jet printing, it is possible to change the pattern or imagery without breaking vacuum. Advantageously, this allows customized patterns to be created on the plastic roll without the need for a roll on a printing station that requires a pre-imaged print roller. Such patterning with an ink jet process would allow sequential numbering of security labels and other security devices, which is highly advantageous. Multi-layer patterning using a single patterning roll or using different patterns in subsequent thin film layers using the ink jet printing process may be used to create complex graphics or even micro-electronics in the security thread. In particular, a security thread with an optically variable feature may be combined with a hidden magnetic bar code in either one dimension, as in a standard bar code, or in a two dimensions, as in a 2D bar code format. The magnetic layer is hidden between other layers of the thin film design, as for example behind a reflective layer or sandwiched between two highly reflective aluminum layers as shown in FIGS. 18 and 19.

To insure good image fidelity, the printing station should be situated on the cooled drum immediately before the deposition of the first layer, typically aluminum, but may be any material with a heat of condensation sufficient to vaporize the imaged oil. Other substrates such as polyimide, polyhexadiene, polypropylene, polyethylene, polystyrene, polycarbonate triacetate, biacetate, and polynathphanate (PEN) may be used instead of the polyethylene terephthalate (PET). With other substrates and other surfaces, patterning oils based on the fundamental surface energies encountered and required low vapor pressures as described above would be used.

Depositing the first layer that is to be imaged is the next process step to be performed. In the case of an OVD security image that is optically variable, either the reflector layer or the absorber layer may be imaged. In general, any layer may be imaged as long as the oil patterning process produces a discreet oil image. For example, the imaging may occur in the dielectric layer by placing the oil image on the prior-deposited layer. In other words, the reflector layer or the absorber layer may be the layer upon which the oil image is placed. Deposition of a metal layer onto the patterned oil results in explosive evolution of liquid oil into gas, causing the depositing layer to be ablated away. There may be some residual oil (several monolayers of oil) remaining in the patterned area which must be removed in order to this imaged oil from transferring further down the web which would in turn cause ghosting (another image pattern) of any subsequent deposition layers.

In a typical case, the aluminum layer or the chromium layer is imaged and then the rest of the design is added to complete a Fabry-Perot structure, i.e. Al (opaque, patterned)/$MgF_2$ 1 QW@ 400 nm to 8QW@ 700 nm/Cr 30% T. The low index $MgF_2$ layer may be substituted by any dielectric material that is highly transmissive in the visible. High index dielectric materials will result in an optically variable foil that is less shifting in color than one that has a large optical shift where a low index dielectric material is used. A partially aluminum layer that has a thickness below the opaque point, for example, thickness in the range 200-800 nm, will give a color shifting film that is partially transparent so that information may be read through the optical stack from the paper, or that is printed on the PET. All color shifts move from long to shorter wavelengths, i.e. from red-to-blue.

To remove residual oil in the patterned area, an oxygen glow situated right after the deposition source on the cooled drum is used. Glows may also be used on the backside of the web before and after the deposition area. In this instance, the 02 glow will remove any oil from the backside of the web that might have transferred during the "inking process" or flash over during the deposition process that could end up on the back side during wind-up. Typically, the oxygen glow is run at 2,200 volts at 100 ma for a 12" wide glow system. Residual oil may be detected on the final coated web by noting the variation in color, for example blotches or ghost like images of the original images.

Figure 20:
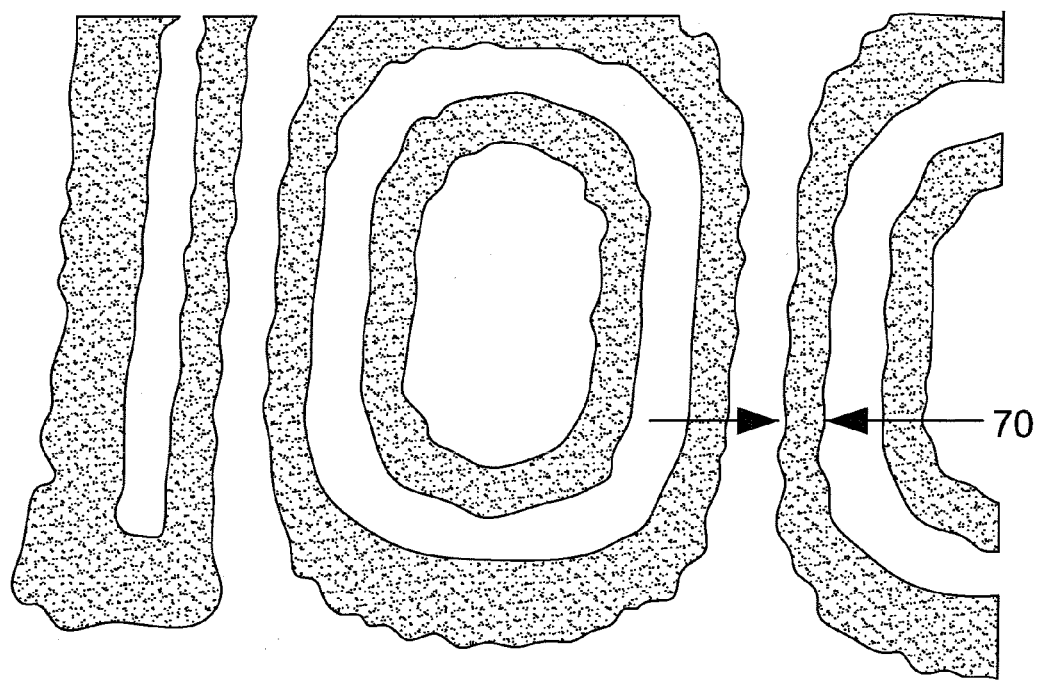
FIG. 20 shows the resolution of a text symbol in a patterned optically variable security thread.
Figure 21:
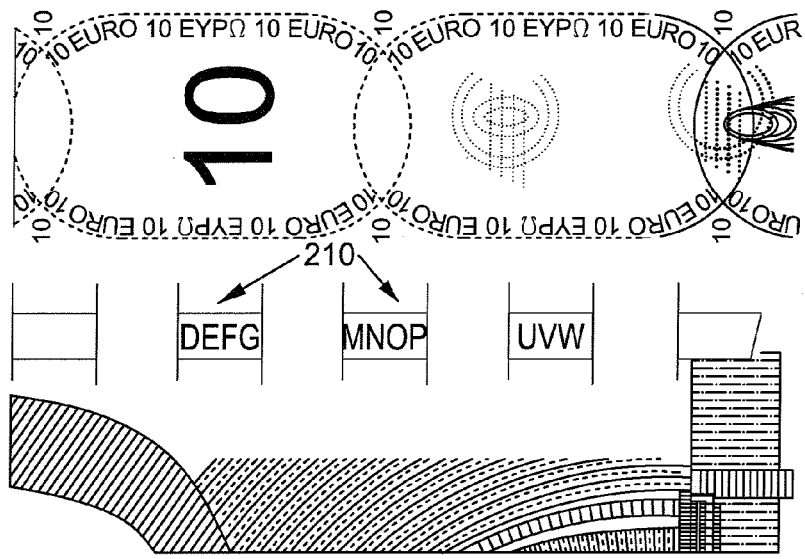
FIG. 21 is an illustration showing a patterned optically variable thread embedded into a bank note in a windowed type format.
Figure 22:
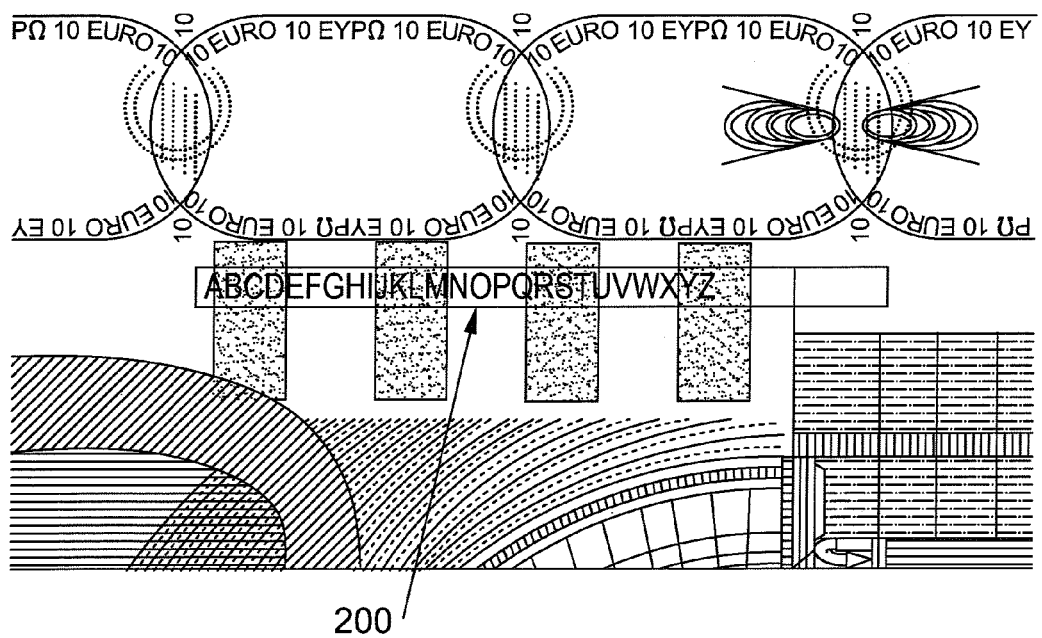
FIG. 22 is a an illustration showing the text of the patterned optically variable thread in a bank note viewed in transmission.

Resolution of the image using the flexographic printing process has shown to be as low as 20 microns although 70 microns is nominal. This is shown in FIG. 20. Besides text, a graphic image can be made by processing a scanned image using a FloydSteinburg technique as found in the software program COREL DRAW™. This program converts the image into square pixels, which have good black (image) and white (no image) contrast. After coating, the web is slit into ribbons between 1 and 5 mm wide wherein the text is generally situated in the center of the ribbon. FIG. 21 show the optically variable thread of this invention windowed into a bank note and FIG. 22 shows the text symbols when viewed in transmission.

Figure 23:
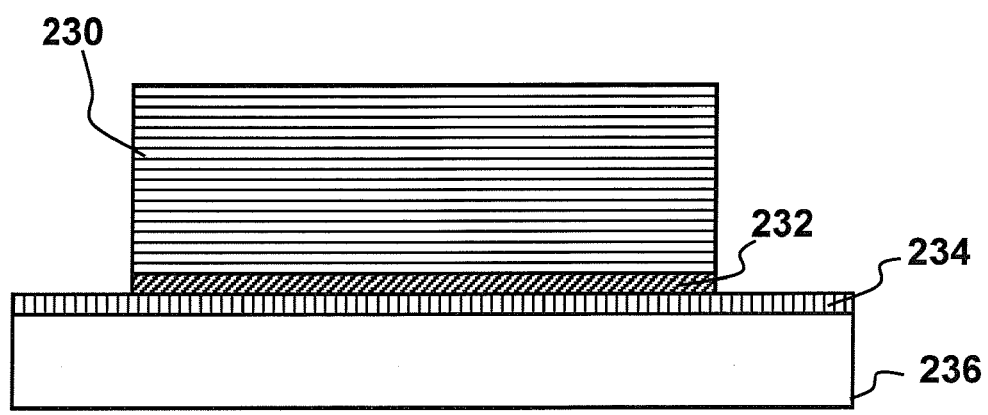
FIG. 23 shows a graphic security label formed from a patterned optically variable foil structure on a pressure sensitive adhesive-releasable label paper stock.

Instead of a ribbon, the device may function as a security stick-on label by applying adhesive 232 to one side of the PET and laminating to a release layer 234 supported by paper carrier 236 and die cutting the label 230 as is shown in FIG. 23. The adhesive can be a solvent based or a water-based adhesive. A suitable adhesive is an acrylic adhesive, among many others. Instead of a label, the product could be made into a hot-stamp security product by inserting a release layer between the carrier web and the vacuum deposited layer.

Of course numerous other embodiments may be envisaged without departing from the spirit and scope of the invention.

What is claimed is:

1. A method for forming an optically variable device upon a substrate having a first side and a second side, the method comprising the steps of: patterning a reflective layer on the substrate using an oil-ablation technique, wherein an oil is applied to selected portions of the substrate; removing oil residue from the first side of the substrate using a first glow discharge, wherein the first glow discharge is formed from a precursor comprising oxygen; depositing thin-film layers so as to be supported by the substrate to form the optically variable device; and removing oil residue from the second side of the substrate using a second glow discharge, wherein only the first side of the substrate has been oil patterned, by application of oil to selected portions of the substrate and the oil residue results from the step of patterning the reflective layer on the first side of the substrate.

2. A method as defined in claim 1, wherein the step of patterning the reflective layer is performed on the first side of the substrate, and wherein the thin-film layers are deposited on the first side of the substrate over the patterned reflective layer.

3. The method of claim 2, further comprising the step of depositing an optical structure over the thin-film layers.

4. The method of claim 2, further comprising the step of depositing an optical structure on the second side of the substrate.

5. The method of claim 2, wherein the second glow discharge is formed from a precursor comprising oxygen.

6. The method of claim 1, wherein the second glow discharge is formed from a precursor comprising oxygen.

7. The method of claim 1, wherein the oil ablation technique includes the step of applying oil in a pattern with an ink jet device.

* * * * *